United States Patent [19]
Russo

[11] Patent Number: 5,927,180
[45] Date of Patent: Jul. 27, 1999

[54] BEVERAGE FLOW POT

[76] Inventor: Thomas L Russo, 51 North St., Proctor, Vt. 05765

[21] Appl. No.: 08/800,988

[22] Filed: Feb. 19, 1997

[51] Int. Cl.⁶ ..................................... A47J 31/00
[52] U.S. Cl. ............................... 99/322; 99/318
[58] Field of Search ............................ 99/316, 317, 318, 99/321, 322

[56] References Cited

U.S. PATENT DOCUMENTS

| | | | |
|---|---|---|---|
| 652,413 | 6/1900 | Wallingford et al. | 99/317 X |
| 5,363,745 | 11/1994 | Lin | 99/317 X |
| 5,453,189 | 9/1995 | Joergensen | 99/317 X |

FOREIGN PATENT DOCUMENTS

| | | | |
|---|---|---|---|
| 15992 | 11/1887 | United Kingdom | 99/317 |
| 7474 | 4/1893 | United Kingdom | 99/316 |
| 19618 | 8/1913 | United Kingdom | 99/318 |

*Primary Examiner*—Reginald L. Alexander

[57] ABSTRACT

There is disclosed a beverage flow system using a vertical filter basket. The basket design allows for maximum surface area, for contact of liquid with coffee bean and/or tea leaves. A rectangular vessel offers a forward and rear position for filter placement, increasing or reducing beverage strength at time of dispensing. A three piece design simplifies operation and manufacturing.

1 Claim, 6 Drawing Sheets

BEVERAGE FLOW POT

BACKGROUND OF THE INVENTION

This invention relates to the brewing and serving of hot beverages such as tea and coffee. This system allows for the complete submersion of tea leaves or coffee beans in a vertical filter. This system makes use of a vertical filter basket which is movable through the interior length of a rectangular brewing vessel, allowing the vessel to be used at a variety of capacity levels. The design of the vertical filter basket allow for maximum surface area, for contact of liquid with coffee beans and/or tea leaves. The rectangular shape of the brewing vessel offers a forward and rear position for filter placement, increasing or reducing beverage strength at time of dispensing. The rectangular vessel shape enhances heated liquid flow during brewing. A three piece design simplifies operation and manufacturing.

SUMMARY OF THE INVENTION

It is the object of the invention to provide the ability to brew coffee and/or tea separately or together for a blended beverage by use of a split filter arrangement.

It is the object of the invention to maximize the flow of heated liquid during brewing by use of a rectangular brewing vessel.

It is the object of the invention to allow for the capability of a varied strength beverage by use of a filter which is mountable in different positions within the rectangular vessel.

For a better understanding of the structure of the invention and its function, further explanation is given below with reference to the attached drawings.

DETAILED DESCRIPTION OF PREFERRED EMBODIMENTS

Figure 1:
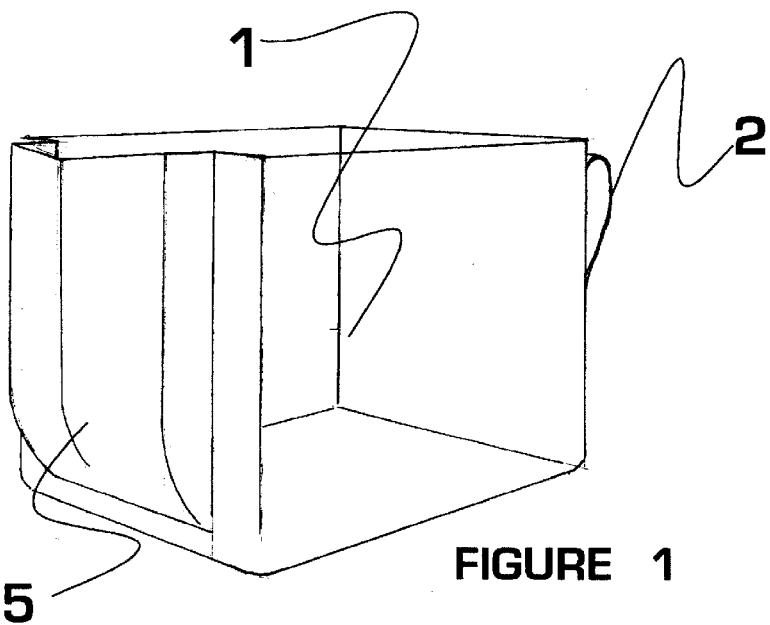
FIG. 1 is a see-thru view of the rectangular brewing vessel, highlighting separate handle, and integrated pouring channel.
Figure 2:
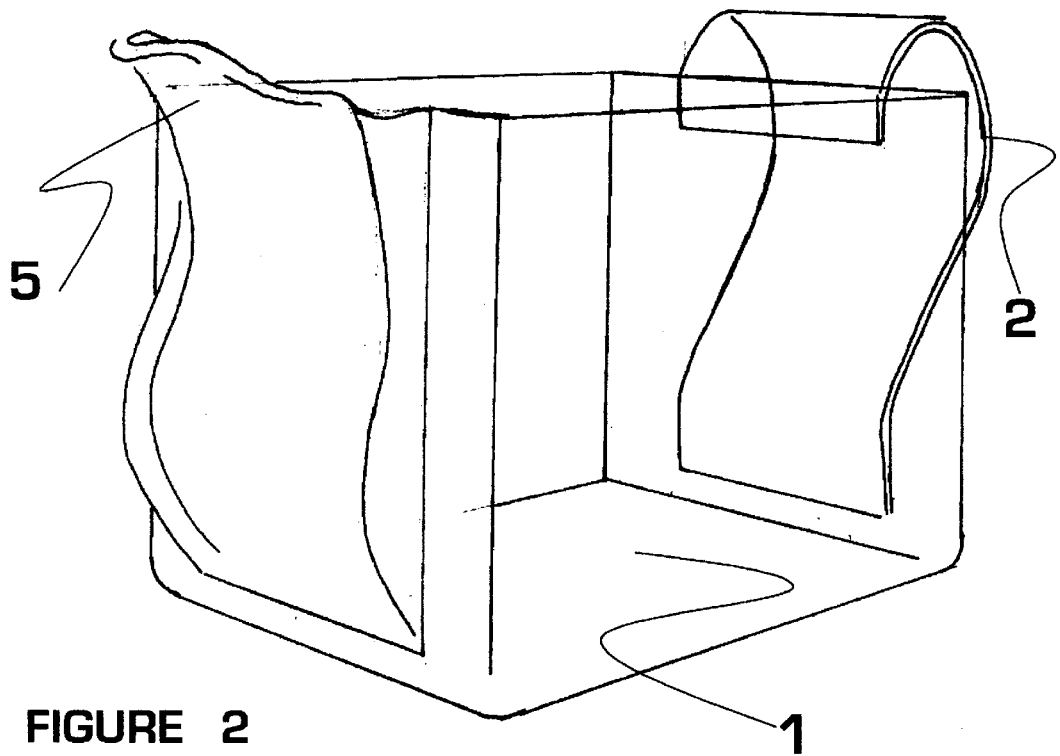
FIG. 2 is an additional view of the rectangular brewing vessel, highlighting a more sculpted integrated poring channel, and separate handle.
Figure 3:
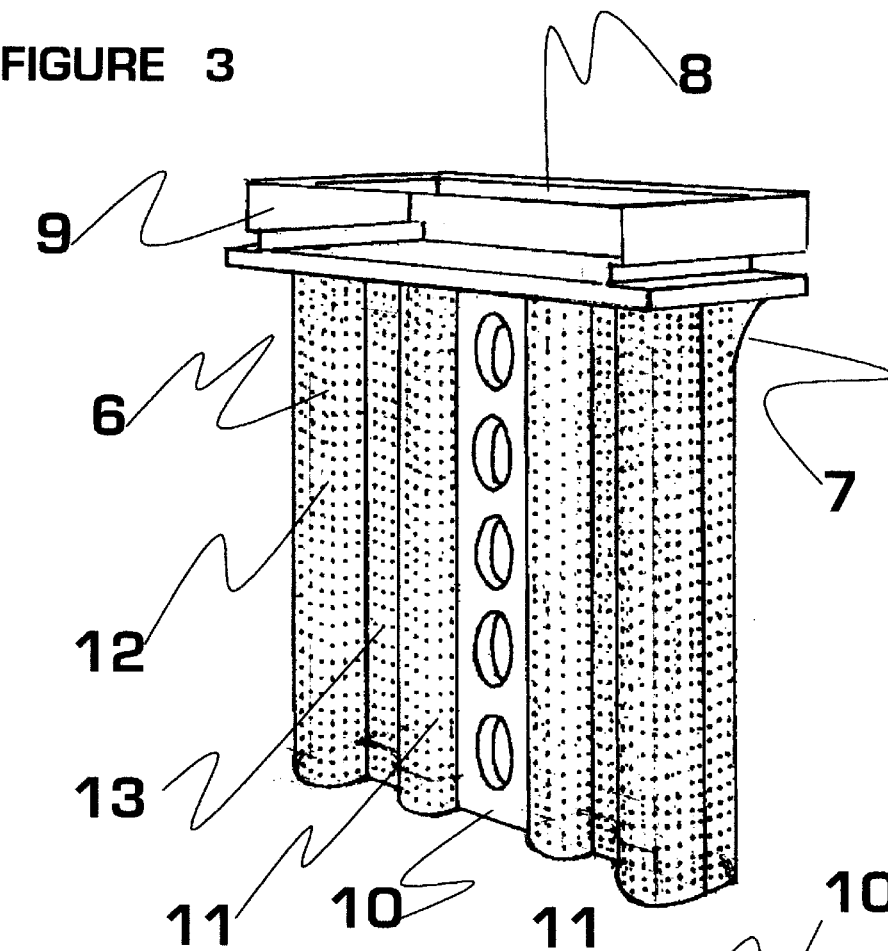
FIG. 3 is a view of the vertical filter basket in upright position, with varied wall design, center divider, and harbor cover connection.
Figure 4:
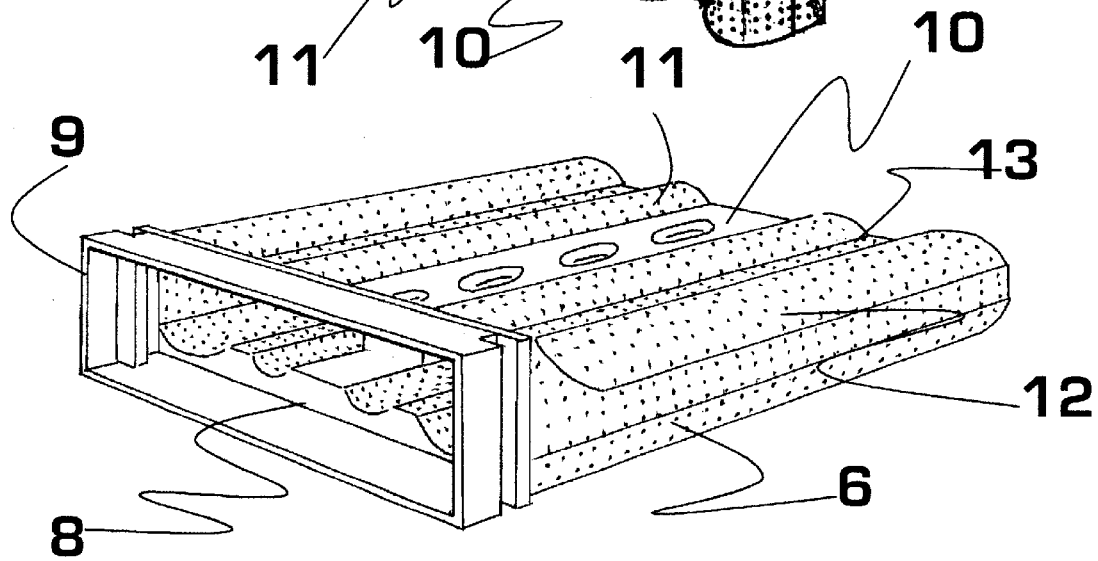
FIG. 4 is a view of the vertical filter basket in horizontal position to reveal interior basket design and harbor cover connection.
Figure 5:
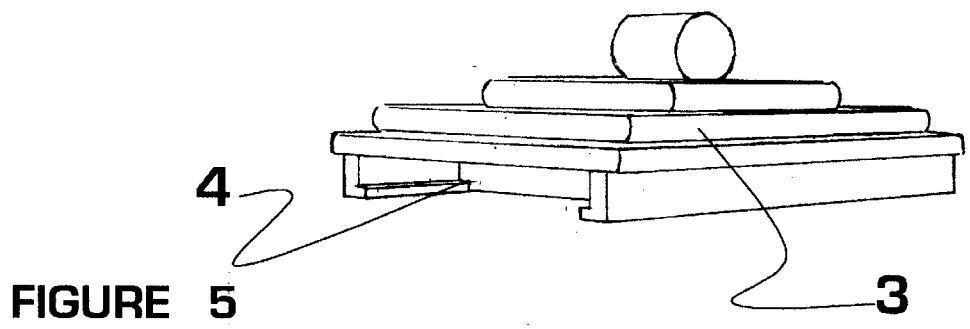
FIG. 5 is a view of the harbor cover for the brewing vessel, illustrating the harbor channel to receive the vertical filter basket.
Figure 6:
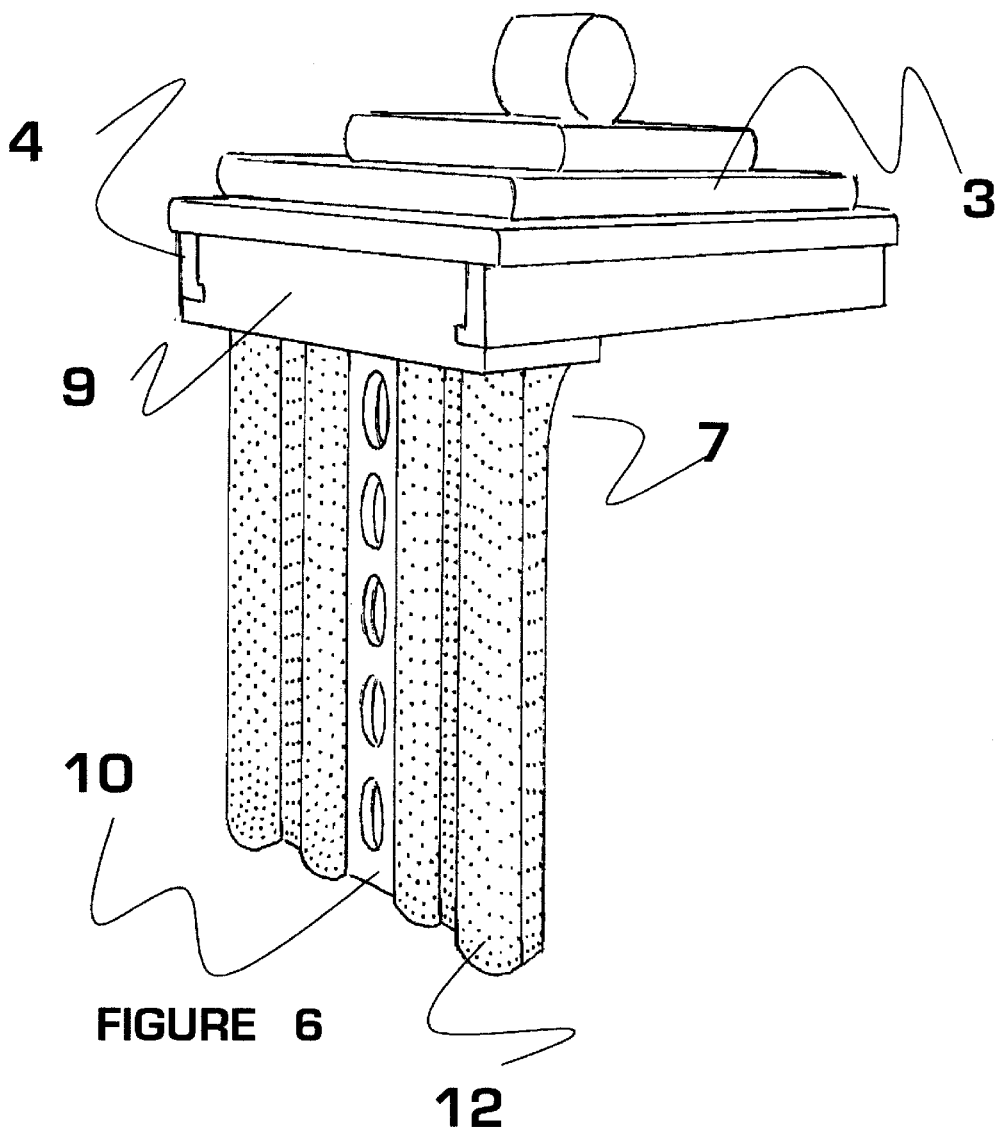
FIG. 6 is a view of the harbor cover for brewing vessel, illustrating proper connection with vertical filter basket.
Figure 7:
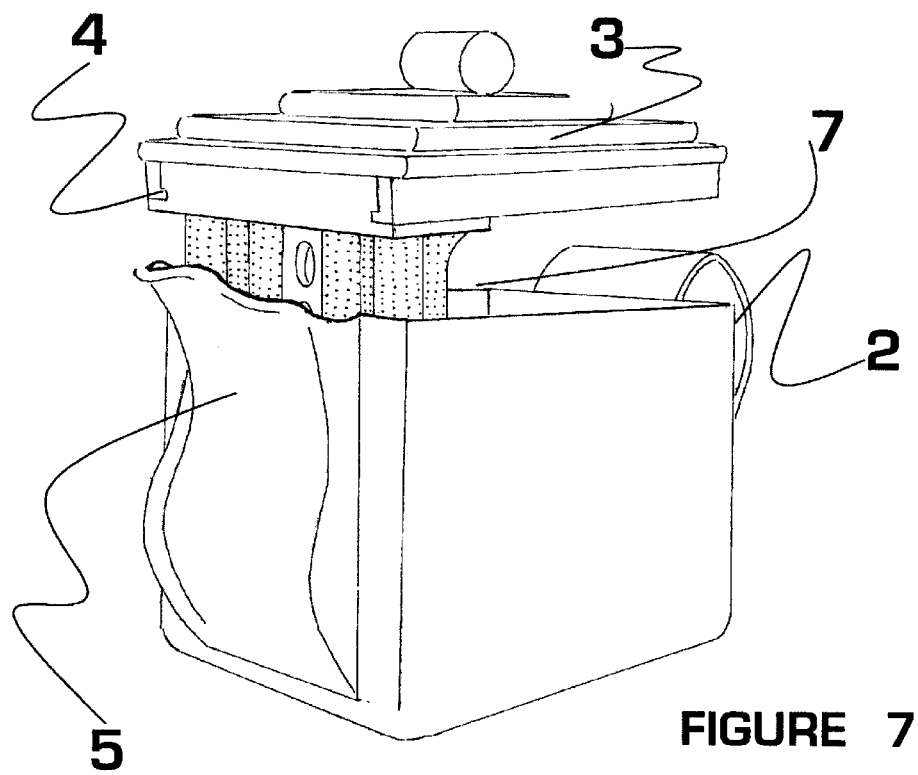
FIG. 7 is a view of the rectangular brewing vessel, illustrating placement of vertical filter basket in forward position.
Figure 8:
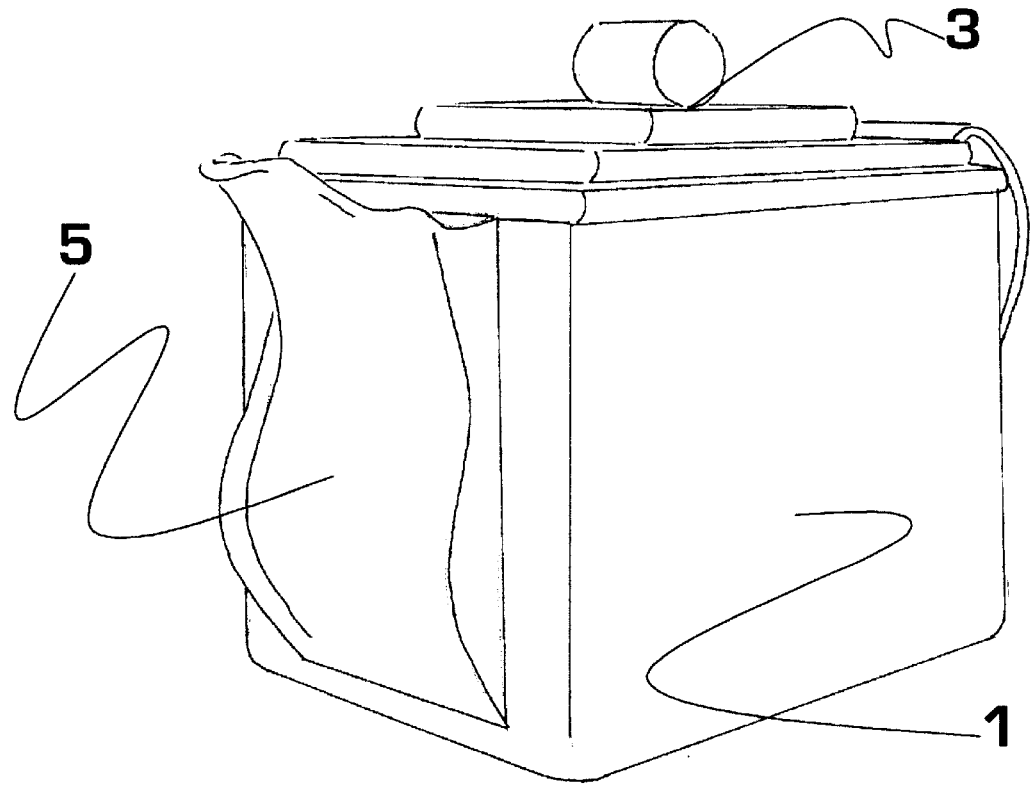
FIG. 8 is a view of the beverage flow pot with cover closed for brewing position.
Figure 9:
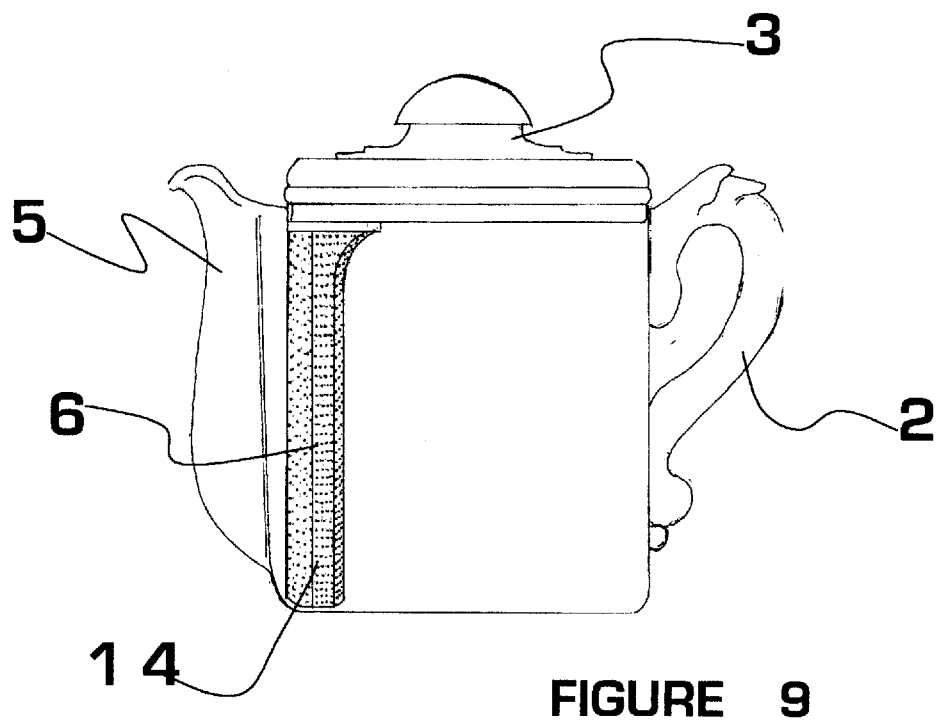
FIG. 9 is a side view of the rectangular brewing vessel complete with harbor cover and vertical filter basket in the forward position.
Figure 10:
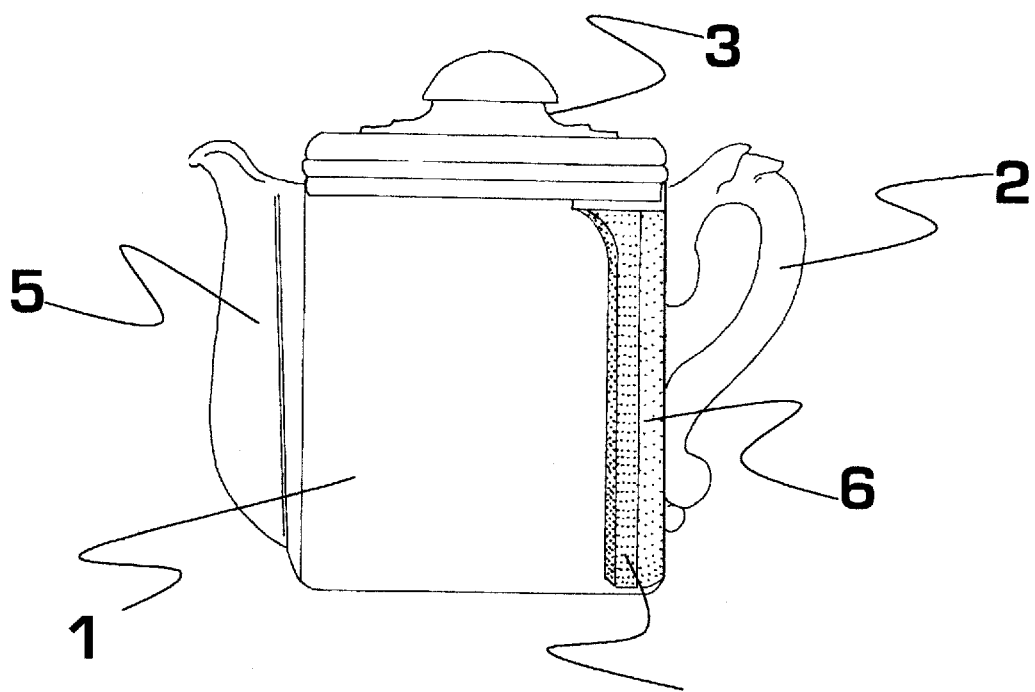
FIG. 10 is a side view of the rectangular brewing vessel complete with harbor cover and vertical filter basket in the rear position.
Figure 11:
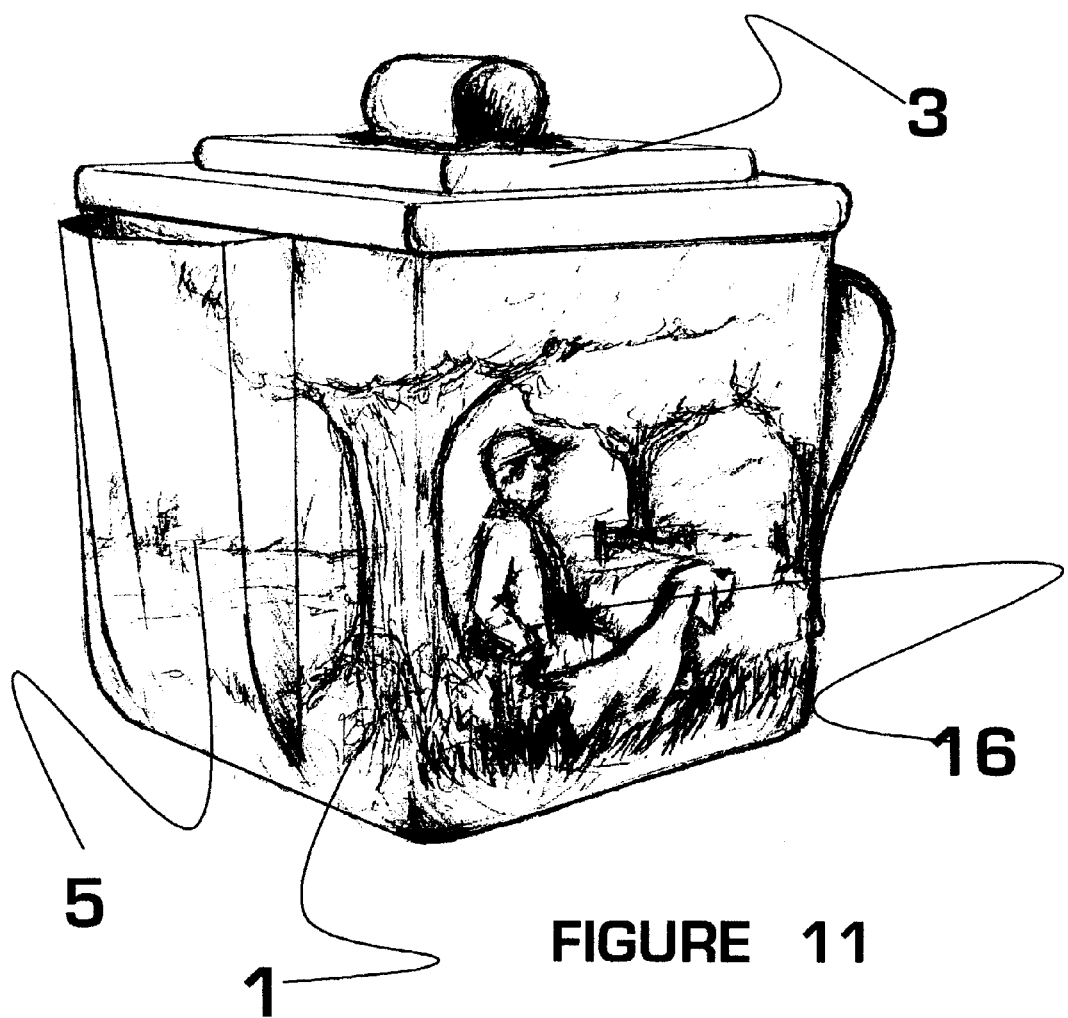
FIG. 11 is a view of the rectangular brewing vessel with harbor cover in a closed brewing position, illustrating one benefit of the rectangular shape providing an excellent display area for a collectable design, embossed or etched thereon.

As shown in FIG. 1 there is provided a rectangular vessel having an upper opening which makes up the brewing vessel 1. This rectangular design allows for a variety of capacity needs while supporting and providing a proper fit for a vertical flow filter basket 6 shown in FIG. 3. The vessel is provided with a sculpted integrated pouring spout 5 mounted at a forward portion thereof and a rearwardly mounted handle 2. There is provided a harbor cover 3 for vessel 1 which provides support for the filter basket 6 and closure of the upper opening. The supporting means is in the form of a channel 4 which extends the length of the harbor cover 3, see FIG. 5. The filter basket 6 is provided with an upper portion 9 which is slidably mountable within the channel 4 of the harbor cover 3. The channel 4 can be a dove tail or straight design in order to hold the filter basket 6 securely in a proper brewing position. The sliding connection allows for horizontal movement of the filter basket 6, this providing mounting of the basket in a forward or rearward position within the rectangular brewing vessel 1. The forward positioning of the basket behind the pouring spout 5 provides a stronger beverage when dispensed because of the flow of liquid through additional extract when dispensing the beverage. The rearward positioning of the basket provides for a milder beverage because any additional extracted concentrate will be diluted with the total liquid volume in the brewing vessel. The vertical filter basket 6 is designed with a varied shape to create greater surface area and to provide a comfortable path of least resistance while pouring. A center section 10 of solid material divides the filter basket into two halves and supports large pouring holes. On each side of center 10 begins the smallest of semi-circular perforated filter columns 11, their smaller size will contain less ground coffee and tea leaves allowing liquid to flow through easier. Next to the smaller columns 11 are outer larger filter columns 12 for holding denser amounts of ground coffee or tea leaves, reducing pouring flow rates through these areas adding to the extract concentrate. The two sets of filter columns 11 and 12 are connected with a flat narrow perforated section 13. The vertical filter basket can be constructed of heat treated glass or stainless steel. The basket should be created with a micro laser to form micro perforations, creating a state of the art filter basket 6 without burrs created by drilling. The vertical filter basket is provided with a circulation curve 7 to circulate heated water through the vertical columns.

The rectangular brewing vessel is formed from stainless steel or heat resistant glass. The rectangular shape provides a unique shape with two distinct sides that can be embellished with art designs.

The vertical filter basket can be removed completely in order to stop brewing and still allow the cover to be replaced, returning the beverage flow pot to a complete look. The vertical filter basket is easy to clean. Additionally, the basket can be provided with an indent on the smaller columns 11 that will correspond to measure marks in the brewing vessel to help create a consistent beverage quality.

I claim:

1. a beverage brewing system comprising: a rectangular brewing vessel having a pouring spout and handle mounted thereon; a cover for said brewing vessel; a vertical filter basket mounted within said brewing vessel through out the length thereof for containing a brewing substance, said filter basket comprising perforated vertical columns which extend from an upper interior portion of the brewing vessel to a lower interior portion of the vessel; a support means on said cover and a mating attachment means on said filter basket to allow support of said filter basket from said cover member, whereby the support and attachment means allow for horizontal movement of said filter basket to a forward or rearward position withing said brewing vessel so as to provide a stronger or milder beverage product upon dispensing from the vessel.

\* \* \* \* \*